Dec. 8, 1925.　　　　　　　　　　　　　　　　　　　　1,564,938
P. I. CHANDEYSSON
FIELD REGULATOR
Filed April 29, 1922
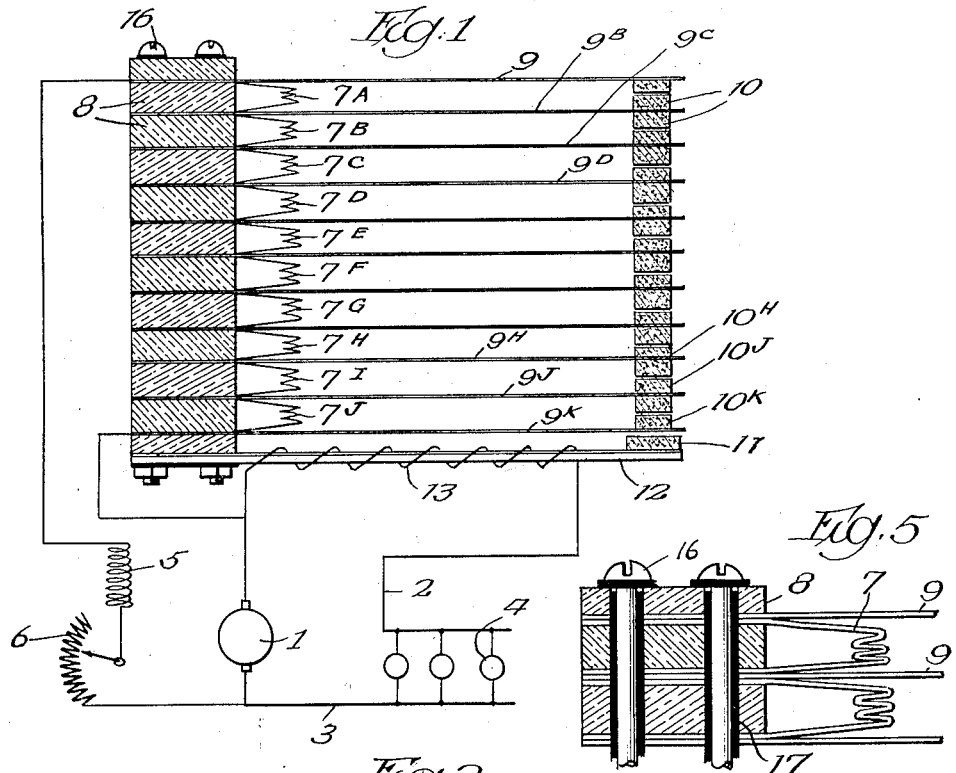
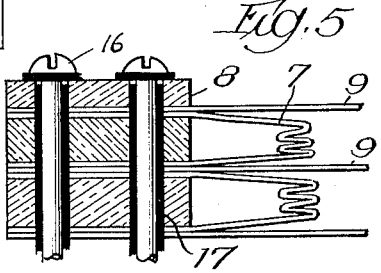
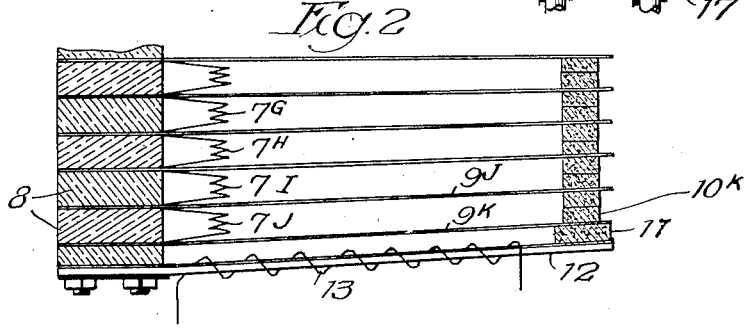
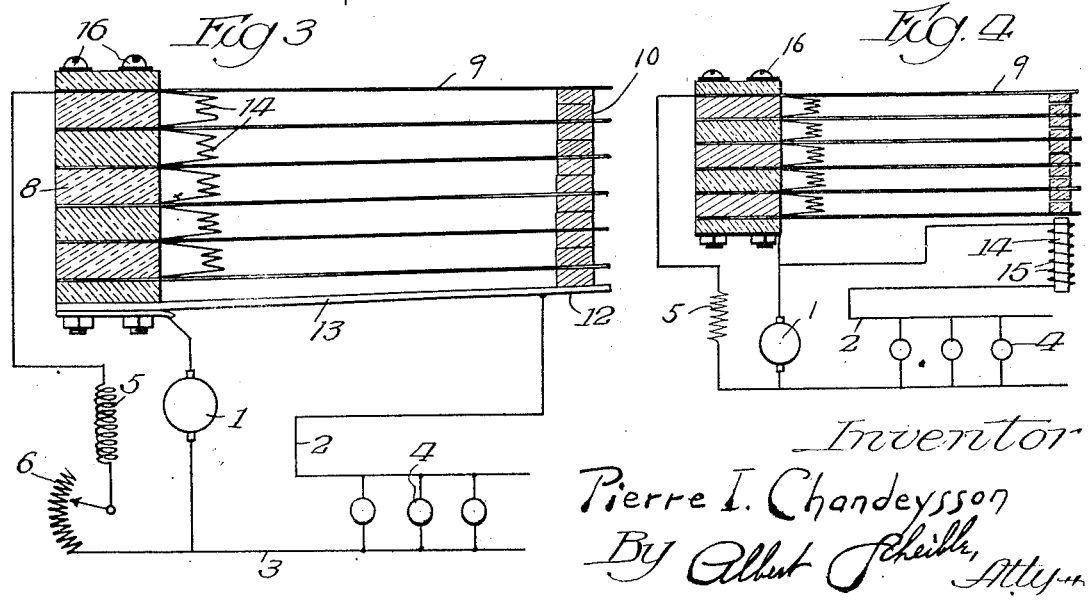
Inventor
Pierre I. Chandeysson
By Albert Scheible, Atty.

Patented Dec. 8, 1925.

1,564,938

UNITED STATES PATENT OFFICE.

PIERRE I. CHANDEYSSON, OF ST. LOUIS, MISSOURI, ASSIGNOR TO MARSHALL ELECTRIC COMPANY, OF CHICAGO, ILLINOIS, A CORPORATION OF ILLINOIS.

FIELD REGULATOR.

Application filed April 29, 1922. Serial No. 557,373.

*To all whom it may concern:*

Be it known that I, PIERRE I. CHANDEYSSON, citizen of the United States, residing at St. Louis, in the county of St. Louis and State of Missouri, have invented certain new and useful Improvements in a Field Regulator; and I do hereby declare the following to be a full, clear, and exact description of the invention, such as will enable others skilled in the art to which it appertains to make and use the same.

My invention relates to electric current regulation and in one of its general aspects aims to provide a simple substitute for the series field winding as commonly employed on direct-current generators for affording an increase of the field excitation with an increase of the current output of the generator. That is to say, my invention aims to provide means adapted for use with a generator which has only a shunt winding on its field, and to arrange these means so as to vary the current flowing through this shunt winding automatically and in response to the variations in the output of the generator, whereby the ordinary shunt winding in connection with the appliance of my invention will afford the equivalent of a compound winding.

Furthermore, my invention aims to provide a simple, easily constructed, inexpensive and durable resistance controller suitable for use wherever a resistance is to be automatically controlled by the strength of a current; aims to provide such a controller in a form in which the same may readily be connected to an ordinary shunt-wound generator as a substitute for a series field winding on the latter; and desirably aims to provide thermostatically operated means for causing the controller to respond to variations in the generated current.

While compound windings or combinations of shunt and series field windings are well suited for many purposes when employed on direct current generators, such compound windings have the disadvantage of permitting a reversing of the generator in case the latter is used for charging storage batteries. For example, it has become quite customary to charge three-cell batteries (such as those used on automobiles) by the constant voltage method which consists in connecting the same either directly or through a small resistance to a 75 volt D. C. circuit. If a compound wound generator is used for this purpose, there is a possibility of having the generator reversed by taking current from the batteries, and as this will cause a reversal of the current flowing through the series winding of the generator, the resulting reversal of the magnetizing current may cause serious damage. Moreover, while the compound winding of a generator may result in producing the same voltage at no load as that at full load, the voltages with intermediate loadings may vary considerably, which is highly undesirable for many classes of current supply.

In one of its general aspects, my invention aims to overcome both of these objections and aims to provide a simple method and means for automatically regulating the generated current throughout the range of loading. For these purposes, it aims to provide simple means for accomplishing the same results as those afforded by the series field winding on a compound wound generator without permitting a reversal of current.

Furthermore, my invention aims to provide a resistance regulator including novel features which may be employed with equal advantage either with a thermo-electrically responsive member as one of the mechanical actuating elements, or with a solenoid employed for this purpose. It also aims to provide a construction which can readily be employed for affording any desired regulating characteristics including those of a compounding action and of a differential action, and which can also be employed for other purposes where an automatically controlled rheostat is needed. Still further and also more detailed objects will appear from the following specification and from the accompanying drawings, in which—

Fig. 1 is a view showing a regulator embodying my invention as used in connection with a shunt wound generator, the generator and the connections to the latter being shown diagrammatically and the regulating appliance of my invention being shown as it appears when the generator is not in operation.

Fig. 2 is a fragmentary view of the lower portion of the regulator of Fig. 1, showing how the resistance portions are shortcircuited by the action of my appliance as would occur when the generator of Fig. 1 is in operation and when the strength of the generated current has reached a predetermined wattage.

Fig. 3 is a view similar to Fig. 1 but showing a regulator embodying my invention arranged and connected for producing a differential effect, and also showing the thermo-responsive action as produced by the flow of current directly through the thermostatic bar which serves as the actuating member of the appliance.

Fig. 4 is a view similar to Fig. 1 but with the speed controlling resistance in the shunt winding of the generator omitted and with a solenoid substituted for the thermostatic bar as the actuating member of the regulator.

Fig. 5 is a fragmentary sectional view showing a desirable mounting for the constituent parts of my field regulator.

Referring first to Fig. 1, I am showing a direct current generator 1 having its terminals connected through supply wires 2 and 3 to a lamp load 4, and having its terminals also connected to a shunt field winding 5 which is in series with a manually controlled resistance 6 for regulating the voltage which is to be maintained by the generator. Interposed in series with the shunt field winding 5 is a multi-sectional resistance, comprising section $7^A$, $7^B$, $7^C$, etc. connected in series with each other. These sections are jointly supported by a series of insulating blocks 8 which desirably are fastened together by bolts 16 extending through insulating tubes 17 after the manner of Fig. 5. Interposed between these insulating blocks at the junctures of the consecutive sections are spring fingers 9, desirably made of brass or bronze, each of which is electrically connected to the one end of both resistance sections adjacent to the same. That is to say, the spring brass finger $9^B$ of Fig. 1 is electrically connected to a terminal of the resistance section $7^A$ and a terminal of the resistance section $7^B$; or in other words, the spring fingers extend from the junctures of the consecutive resistance sections. These spring fingers desirably extend in the same general direction and may be fastened to the insulating blocks by the same bolts 16 which secure the resistance sections to the latter. This is readily done by providing alined perforations in the resistance blocks 8, the ends of the resistance sections 7, and the spring fingers 9. With such an assembly, the bolts 16 simultaneously clamp all parts together, these bolts being insulated from the metal parts by the tubes 17, which also extend through the same perforations.

Each resistance unit has an intermediate coiled part and ends or tips of such length so as to support the coil close to the adjacent fingers 9 etc. It will thus be seen that the several resistance units are housed and protected by and between adjacent fingers, affording a compact and simple assemblage.

Each of the spring fingers 9 carries at or near its free end a pair of carbon buttons 10 projecting respectively from the opposite faces of the strip, the said buttons being all in alinement or registry with each other, but the thickness of the buttons being such that the resiliency of the spring fingers carrying the same will normally hold the consecutively disposed buttons out of contact. For example, the buttons carried by the spring finger $9^C$ in Fig. 1 will be normally out of contact with those carried by the spring fingers $9^B$ and $9^D$. However, the contact buttons 10 carried by adjacent strips can be brought into engagement by a flexing of one strip with respect to the other. Consequently, an upward flexing of the lowermost spring finger $9^K$ in Fig. 1 will cause the carbon button $10^K$ to contact with one of the carbon buttons carried on the next higher spring finger $9^J$, thereby shortcircuiting the resistance section $7^J$. If the flexing of the spring finger $9^K$ is continued a trifle further, this flexing will cause the spring finger $9^J$ to flex also, thereby bringing the upper carbon button $10^J$ on the latter in engagement with the lower carbon button $10^H$ carried by the spring finger $9^H$, thus shortcircuiting the resistance section $^I$; and so on. In other words, the upward flexing of the free end of the spring finger $9^K$ will consecutively effect the shortcircuiting of one or another of the resistance sections after the manner shown in Fig. 2.

To produce this flexing I employ means automatically responsive to some characteristic of the generated current, such as the wattage of the latter. Thus, Fig. 1 shows the free end of the lower spring finger $9^K$ as adjacent to an insulating button 11 carried by a thermostatic bar 12 which is desirably disposed parallel to the spring fingers and which has its constituent portions of dissimilar material so arranged that the lower one thereof has the greater coefficient of expansion. This thermostatic bar 12 is surrounded by a coil 13 connected in series with the circuit wire 2 and of such resistance as to be heated by the flow of current from the generator to the load, thus subjecting the thermostatic bar to a heating effect which is proportioned to the current supply from the generator.

From the above, it will be evident that when there is no load on the circuit, the entire multi-sectional resistance is in series with the shunt winding, thus limiting the strength of the field excitation to a predetermined amount. However, as the load on the generator increases, the heating effect of the coil 13 will cause the thermostatic bar 12 to flex upwardly to an extent dependent on that heating effect (or in other words on the amount of generated current) so as to decrease the resistance 7 correspondingly. By so doing, I increase the amount of current flowing through the field coil 5 and hence increase the field strength, and by properly proportioning the various elements (including the resistance sections) I can readily make this increase in field strength such that it will automatically offset the tendency of the generator to drop in voltage with its increase of load. At the same time, the inherent resiliency of the spring fingers 9 will continuously tend to return these to their normal parallel positions in which they interrupt the shortcircuiting of the resistance sections, so that a decrease in the generated current and a consequent decrease in the flexing of the thermostatic bar will cause a corresponding increase of the amount of resistance connected in series with the field winding.

My regulator will therefore respond automatically to fluctuations in the load on the generator, and with suitably proportioned resistance sections can readily be made to maintain either a uniform voltage or one having any desired curve of voltage drop. However, when all resistance sections have been shortcircuited, the action ceases and any further increase in load will find the same operating as a simple shunt-wound generator with the normal drooping characteristic of the latter. Thus, while the generating outfit as above described can easily be adjusted to maintain a uniform charging voltage for any load up to the normal at which all sections of the rheostat are shortcircuited, the addition of further batteries to the load will cause the voltage to decrease materially, thereby safeguarding the generator against damage from undue loading.

From the above it will be evident that the appliance of my invention is exceedingly simple both in construction and in operation, and by employing carbon buttons as the contact elements I avoid a sticking of these parts. Furthermore, the changes in curvature of the various spring fingers during their action of flexing and of transmitting pressure to one another causes the adjacent contact buttons to rub upon each other, thereby keeping the contact surfaces clean. It will also be evident that my appliance involves no change of the generator connections or construction but can readily be applied to any ordinary shunt wound generator. So also, the use of my invention in no way interferes with any manual control such as might be effected through an adjustable resistance 6.

However, while I have heretofore described my invention is an embodiment affording a convenient substitute for a series or compounding field winding and having the actuation afforded through the flexing of a thermostatic bar surrounded by a heating coil, I do not wish to be limited to this particular combination, nor to the various details of construction and arrangement as above disclosed. Obviously, many changes or modifications might be made without departing either from the spirit of my invention or from the appended claims.

For example, the equivalent of a differential winding can readily be afforded by inverting the thermostatic bar after the manner illustrated in Fig. 3. This shows a thermostatic bar 13 so constructed that it will normally be flexed upwardly to a position in which it holds all of the carbon contact buttons in a resistance-shunting disposition. It also shows the current flowing directly through the thermostatic bar, the latter being arranged for obtaining an unflexing action by the direct heating effect of the current flowing through the bar. In this case, the resistance sections 14 in series with the field winding are all normally short-circuited, but an increase in the generated current will successively rupture the short-circuiting of one after another of the resistance sections, thereby decreasing the amount of field excitation.

Fig. 4 shows still another embodiment, namely one in which no manually controlled resistance is employed in series with the field winding and in which the actuation of the spring fingers is effected by the core 14 of a solenoid 15 which is in series with one of the supply wires of the circuit, so that the actuating member in this instance is electromagnetic instead of electro-thermostatic.

Furthermore, it will be evident that even with a thermo-responsive means as shown in Figs. 1 or 3, the controlling of the regulating rheostat depends simply on the current flowing through the wire 2, regardless of the source of the current flowing through that wire. Hence my invention will obviously be adapted also for any purpose where it may be desirable to increase or decrease a resistance in response to variations in a current which is not flowing through that resistance.

I claim as my invention:—

In a regulator, a resistance including a series of spaced spring fingers, a series of coiled resistance units interposed in the spaces between the respective fingers and having intermediate coils and tips engaged with adjacent fingers, insulating blocks interposed in the spaces between adjacent fingers and engaged with the tips of the resistance units, the tips being of such length so as to support the coils by and from their tips and close to the adjacent fingers so as to be housed by the latter, a button carried by each finger, and means to connect the fingers and the tips of the units to the blocks.

Signed at St. Louis, Missouri, April 4, 1922.

PIERRE I. CHANDEYSSON.